Patented Jan. 17, 1928.

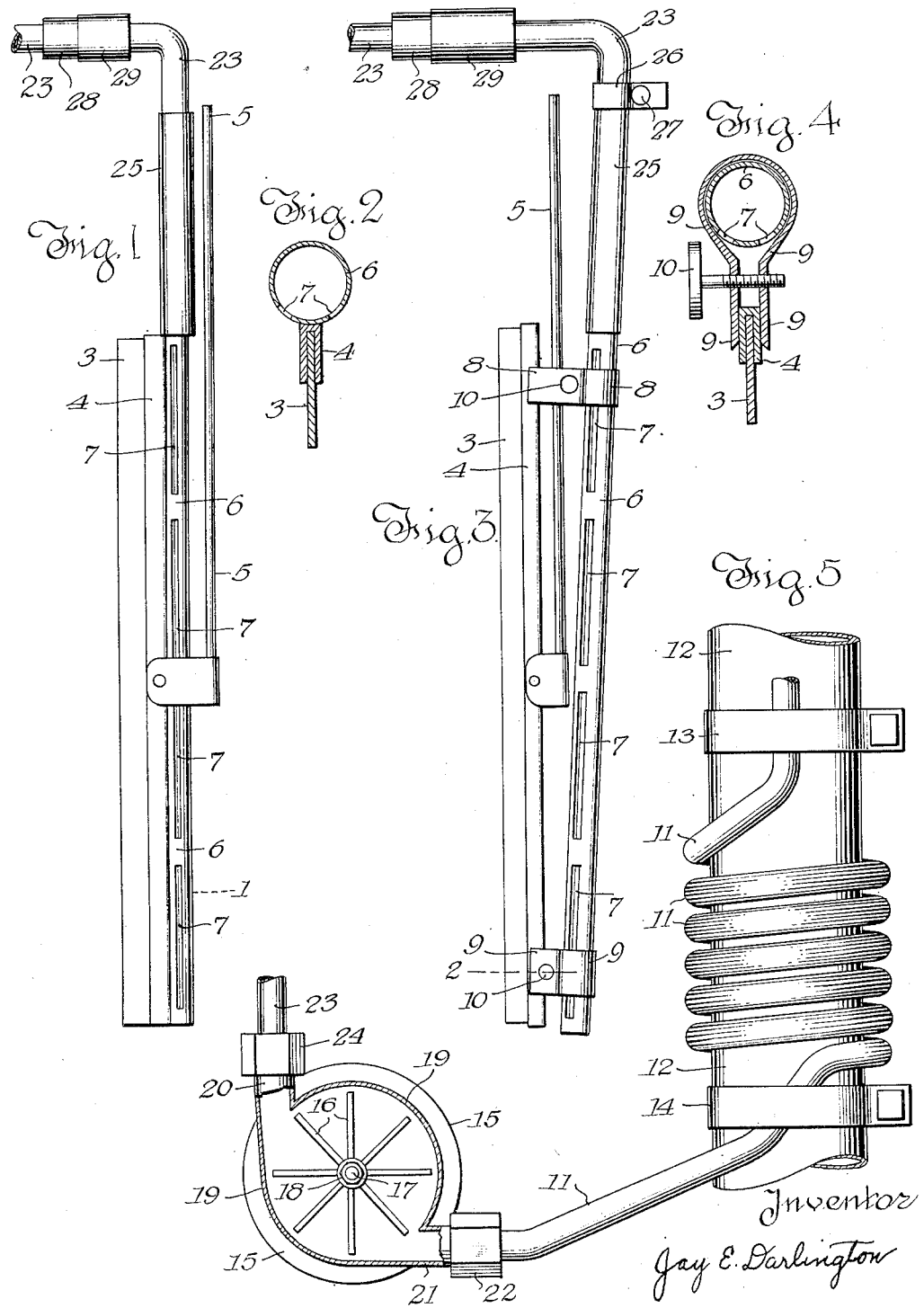

1,656,473

UNITED STATES PATENT OFFICE.

JAY EMERSON DARLINGTON, OF BELDING, MICHIGAN.

WINDSHIELD HEATER.

Application filed December 31, 1926. Serial No. 158,390.

My invention relates to improvements in windshield heaters, in which hot air is blown against the surface of the windshield from a nozzle, which is preferably attached to the windshield wiper. Heated air is drawn from around the exhaust pipe of an engine or other suitable source of heat, and is forced through a pipe to the nozzle, by means of a blower.

The object of my invention is to provide a hot air heater for windshields which will melt snow or ice from the path of the windshield wiper, thus facilitating the operation of the wiper and overcoming the common difficulty of wipers becoming clogged in snow or sleet storms.

A further object of my invention is to provide a device of this class which has the advantages of small size, light weight and simple construction, which is inconspicuous and easy to install on a motor vehicle, and which is highly efficient in melting and removing frozen moisture from the windshield.

A further object is to provide a device of this class which can easily and quickly be attached to any windshield wiper when it is needed, and detached therefrom when not required, and which is of such light construction that it can be readily carried by the wiper without impeding the action thereof, and without obscuring the driver's vision.

A further object is to provide a device of this class which is equipped with a squeegee member and which is adapted to be connected to any propelling mechanism, thus making it adapted to replace the squeegee members now in use on windshield cleaning devices.

Other objects will appear from the following description:

I attain these objects by means of the mechanism illustrated in the accompanying drawing, in which—

Figure 1 is a side elevation of my heater, secured permanently to a wiper of conventional design. Figure 2 is a cross section of said heater, along line 2—2 in Fig. 1. Figure 3 is a side elevation of my heater secured to a common type of wiper by means of detachable clamps. Figure 4 is a cross-section of said heater along line 4—4 in Fig. 2. Figure 5 is an elevation or plan view showing the blower, air pipe and mode of attaching said air pipe to an exhaust of a motor. Similar numerals refer to similar parts throughout the several views.

The flexible strip on the wiper, which is in contact with the windshield, is indicated by numeral 3. The rigid holder of strip 3 is indicated by numeral 4, while numeral 5 indicates the reciprocating lever which connects the wiper to any propelling device. I have shown the air nozzle 6 of my heater, in the form of a tube extending longitudinally along the wiper and having openings or slits 7 on each side for the escape of air to the surface of the windshield, the lower end being closed. When constructed as shown, it is but little wider than the wiper and does not obstruct the driver's view. It may be built into the wiper or secured permanently thereto by soldering or welding, as shown in Figs. 1 and 2. In Figs. 3 and 4, it is shown secured to the wiper by means of clamps 8 and 9, which are adjusted by thumbscrews 10. This latter arrangement permits removal of the heater nozzle when not in use.

In Fig. 5, I have shown a convenient means of obtaining heated air. A thin pipe or tube 11, which is preferably made of copper or some other metal which conducts heat readily, is wrapped tightly several times around the exhaust pipe 12 or other source of heat, and is held in place by clamps 13 and 14. Tube 11 becomes heated from contact with the exhaust pipe and heats the air which is drawn through it. Any other source of heat may be used, such as tapping the exhaust pipe and drawing hot gas therefrom through pipe 11, but this has the undesirable feature of transferring smoke to the windshield. The means I have shown provides a clean source of hot air.

The air is drawn through pipe 11 by means of a rotary blower which is preferably driven by a small electric motor 15 attached to the blower, and of any suitable design, electric current being supplied by the battery or generator of the motor vehicle, when the heater is used thereon. The blower is equipped with revolving fan blades 16, which are preferably secured directly to the motor shaft 17 and held in place by nut 18. The case 19 of the blower is shown partly cut away to expose the blades. It has two threaded nipples 20 and 21. Pipe 11 is secured to nipple 21 by any suitable connection 22 and a pipe 23 is secured to nipple 20 by means of a similar connection 24. Pipe 23 (Figs. 1, 3 and 5) extends by any suitable route to a point near the windshield wiper. This pipe may be made of a flexible material such as rubber instead of metal, to facilitate installation of the device, if desired. Said pipe 23 is connected to the air nozzle 6, on the wiper, by means of a flexible tube 25, which fits over nozzle 6 and is cemented thereto. When nozzle 6 is installed permanently in or on the wiper, as in Fig. 1, tube 25 is cemented over the end of pipe 23, but where nozzle 6 is adapted to be detached from the wiper, as in Fig. 3, the tube 25 slips over the end of pipe 23 and is secured thereto by means of a clamp 26 which is adjusted by thumbscrew 27, thus permitting removal of tube 25 with nozzle 6. Pipes 11 and 23 are preferably covered with a heat insulator 28 of asbestos or other suitable material.

The best method of installing my invention on a motor vehicle is as follows: Locate the blower under the hood and control it by a suitable electric switch on the dash. Lead the pipe 23, which is of small diameter, through under the dash, up along the inside of a corner post, along above the windshield, and extend the end out as near the wiper as possible, as shown in Figs. 1 and 3.

All parts of the heater which are carried by the wiper, may be made of very light material, since little strength is required, and the weight may further be reduced by using aluminum, if desired. Thus the action of the wiper is not impeded. When constructed and installed in the manner shown, a blast of hot air is brought in close contact with the windshield on either side of the wiper, thus melting ice and snow from the path of the wiper and preventing it from accumulating to clog the wiper or blur the vision, as commonly occurs in sleet or soft snow storms. It will also be seen that this device is durable, inexpensive to manufacture and easy to install.

While I have shown and described the preferred embodiment of my invention, it will be understood that I do not wish to limit myself to the precise construction set forth herein, since various changes in the form, proportion and minor details of construction may be resorted to without departing from the principle or sacrificing any of the advantages of this invention.

It will be seen that in addition to motor vehicles, my invention is well adapted for use on street car windows, locomotive cabs, boats and the like. Hence, the word "windshield" is herein used broadly to include any window.

I claim as my invention:

1. A device of the class described, comprising a wiper carrying arm, a tubular member provided with openings along its length, said member being detachably secured to said arm adjacent to the wiper member thereof, a pipe for supplying air to said tubular member and a flexible connection between said pipe and the tubular member.

2. A device of the class described, comprising a wiper carrying arm, a tubular member provided with openings along its length, said member being secured to said arm adjacent to the wiper member thereof, a pipe for supplying air to said tubular member, a flexible connection between said pipe and the tubular member, means for heating a supply of air and propelling means for forcing said air through said pipe to the nozzle.

3. A windshield heater comprising a wiper carrying arm, a tubular member provided with openings along its length, said member being secured to said arm adjacent to the wiper member thereof, means for heating a supply of air, and a power driven blower connected with said heating means and with said tubular member for forcing said heated air through said openings in the tubular member.

4. A device of the class described, comprising a squeegee member adapted to be traversed over the surface of a windshield, an air nozzle secured thereto, means for heating a supply of air, means for conveying said air from the heating means to the nozzle, and means for forcibly ejecting the air from the nozzle.

JAY EMERSON DARLINGTON.